(12) United States Patent
Phelps et al.

(10) Patent No.: US 7,054,969 B1
(45) Date of Patent: May 30, 2006

(54) APPARATUS FOR USE IN A COMPUTER SYSTEM

(75) Inventors: Richard Carl Phelps, Bristol (GB); Paul Anthony Winser, Bristol (GB)

(73) Assignee: ClearSpeed Technology plc, Bristol (GB)

( * ) Notice: Subject to any disclaimer, the term of this patent is extended or adjusted under 35 U.S.C. 154(b) by 0 days.

(21) Appl. No.: 09/787,353

(22) PCT Filed: Sep. 16, 1999

(86) PCT No.: PCT/GB99/03089

§ 371 (c)(1),
(2), (4) Date: Jun. 12, 2001

(87) PCT Pub. No.: WO00/17759

PCT Pub. Date: Mar. 30, 2000

(30) Foreign Application Priority Data

| Sep. 18, 1998 | (GB) | 9820410.0 |
| Sep. 18, 1998 | (GB) | 9820412.6 |
| Sep. 18, 1998 | (GB) | 9820428.2 |
| Sep. 18, 1998 | (GB) | 9820430.8 |

(51) Int. Cl.
- *G06F 13/36* (2006.01)
- *G06F 13/362* (2006.01)
- *G06F 13/00* (2006.01)

(52) U.S. Cl. ............ 710/113; 710/107; 710/117; 710/309

(58) Field of Classification Search ........ 710/126, 710/305, 309, 241, 113, 107, 249, 30, 117; 709/225, 251–253; 701/232, 236

See application file for complete search history.

(56) References Cited

U.S. PATENT DOCUMENTS

| 4,488,232 A | 12/1984 | Swaney et al. |
| 4,669,079 A | 5/1987 | Blum |
| 4,709,364 A * | 11/1987 | Hasegawa et al. ......... 370/455 |
| 5,375,215 A | 12/1994 | Hanawa et al. |
| 5,400,334 A * | 3/1995 | Hayssen .................... 370/245 |
| 5,450,547 A | 9/1995 | Nguyen et al. |
| 5,481,681 A | 1/1996 | Gallo et al. |

(Continued)

FOREIGN PATENT DOCUMENTS

| EP | 0048869 X | 4/1982 |

(Continued)

OTHER PUBLICATIONS

"Universal Serial Bus Specification" Revision 1.0. Jan. 15, 1996. pp. 2 and 27-31.*

(Continued)

*Primary Examiner*—Rehana Perveen
*Assistant Examiner*—Thomas J. Cleary
(74) *Attorney, Agent, or Firm*—Potomac Patent Group PLLC

(57) ABSTRACT

Apparatus for use in a computer system comprises a bus architecture, a plurality of modules connected to the bus architecture, at least one module being latency tolerant and at least one module being latency intolerant. The bus architecture comprises a primary bus (3) having latency intolerant modules connected thereto, a secondary bus (4) having latency tolerant modules connected thereto, and a primary to secondary bus interface module (5) interconnecting the primary and secondary buses.

8 Claims, 16 Drawing Sheets

U.S. PATENT DOCUMENTS

| | | | |
|---|---|---|---|
| 5,541,932 A | | 7/1996 | Nguyen et al. |
| 5,619,661 A | | 4/1997 | Crews et al. |
| 5,627,976 A | | 5/1997 | McFarland et al. |
| 5,664,117 A | | 9/1997 | Shah et al. |
| 5,754,807 A | | 5/1998 | Lambrecht et al. |
| 5,912,710 A | * | 6/1999 | Fujimoto .................... 348/445 |
| 5,986,644 A | * | 11/1999 | Herder et al. ................ 345/158 |
| 6,230,226 B1 | * | 5/2001 | Hu et al. .................... 710/305 |
| 6,232,932 B1 | * | 5/2001 | Thorner ...................... 345/1.3 |

FOREIGN PATENT DOCUMENTS

| | | |
|---|---|---|
| EP | 0384621 A | 8/1990 |
| WO | WO8001421 X | 7/1980 |
| WO | WO 89/02127 X | 3/1989 |

OTHER PUBLICATIONS

"IEEE Standard for a High Performance Serial Bus" 1996. pp. i-ii and 31-35.*

"Universal Serial Bus Specification" Revision 1.0. Jan. 15, 1996. pp. 2 and 27-31.*

"IEEE Standard for a High Pel-formance Serial Bus" 1996. pp. i-ii and 31-35.*

"Circulate". Cambridge Dictionary of American English. Cambridge Dictionaries Online, Cambridge University Press. 2004. Retrieved from Internet Jun. 21, 2005. <http://dictionary.cambridge.org/define.asp?key=circulate*1+0&dict=A>.*

* cited by examiner

| MODULE | PRIORITY |
|---|---|
| M1 | H |
| M2 | M |
| M3 | L |
| M4 | H |
| M5 | M |
FIG. 14
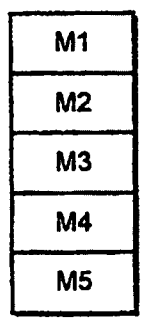
FIG. 15
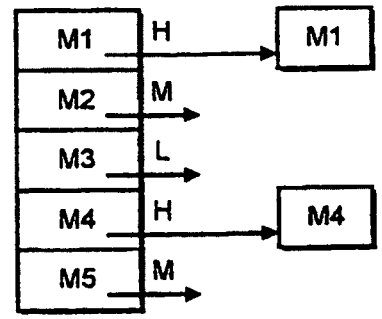
FIG. 16
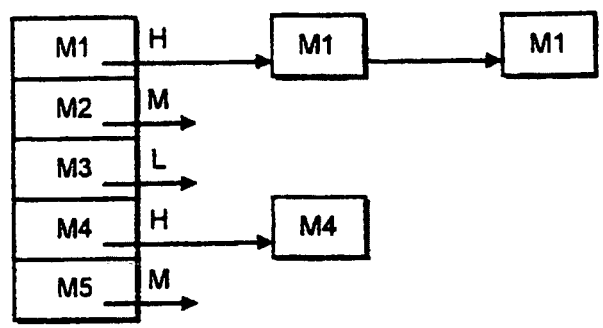
FIG. 17

| T | R1 | W1 | R2 | W2 | R3 | W3 | .... | |
|---|---|---|---|---|---|---|---|---|
| W |  | W1A | W1B | W2A | W2B | W3A | W3B | .... |
| R |  |  |  | R1A | R1B |  |  |  |
| TIME | t | t | t | t | t | t | t |  |
FIG. 21
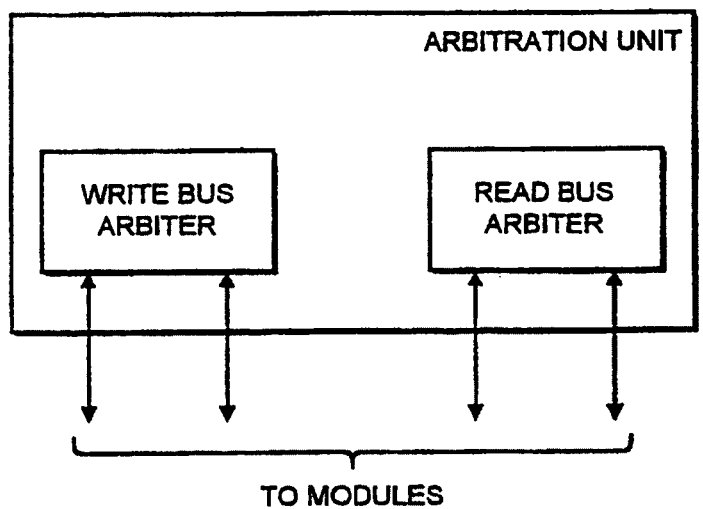
FIG. 22
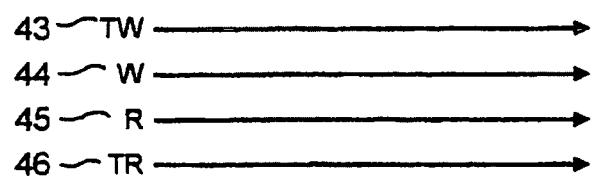
FIG. 23

APPARATUS FOR USE IN A COMPUTER SYSTEM

TECHNICAL FIELD OF THE INVENTION

The invention relates to apparatus for use in a computer system, and in particular, to apparatus utilising a bus architecture.

BACKGROUND TO THE INVENTION

FIG. 1 of the accompanying drawings shows a computer system including a typical communications bus architecture. A plurality of modules are connected to a combined read and write bus and to a separate control bus, both of which are well known tri-state buses. The modules may be, for example, memory devices, graphics controllers, CPU'S, and so on. The control bus and the read/write bus service all the requirements of the system, enabling the modules to transfer data between one another or externally, for example to external memory or control devices.

With the ever increasing need to integrate more complexity and functionality into computer systems, and in particular into systems provided on a single integrated circuit, i.e. system-on-chip solutions, bus architectures need to be flexible enough to cope with the differing needs that individual modules will place on the system.

One aspect that a system has to take into consideration is "latency". Latency is the amount of time that a module has to wait in order to transmit or retrieve data. Some modules are more sensitive, or intolerant, to this waiting period than others. Therefore, if latency sensitive, or latency intolerant, modules are forced to wait beyond a certain time limit, they will behave in a manner that will adversely affect the system performance and functionality.

As more modules are connected to a bus, the size of the bus inevitably needs to be increased. This in turn can lead to an increased module-to-module distance, which increases the time taken to transfer data between modules. This can have an adverse effect on latency sensitive, or intolerant, modules.

In systems which use a large amount of data that must be processed at high speed, for example graphics systems, it is important to be able to have efficient, high speed data transfer between modules of the system. A communications bus is therefore desirable which can enable different usage of the bus and is able to support high speed and high volume of traffic data transfer.

SUMMARY OF THE INVENTION

The aim of the present invention is to provide an improved computer system.

According to the present invention, there is provided apparatus for use in a computer system comprising:
a bus architecture;
a plurality of modules connected to the bus architecture, at least one module being latency tolerant and at least one module being latency intolerant, wherein the bus architecture comprises:
a primary bus having latency intolerant modules connected thereto;
a secondary bus having latency tolerant modules connected thereto; and
a primary to secondary bus interface module interconnecting the primary and secondary buses.

The length of the secondary bus will usually be greater than that of the primary bus. The primary bus is preferably less than, or equal to, three pipeline stages in length.

Latency tolerant modules connected to the secondary bus can be arranged such that the least tolerant modules are located closer to the primary bus than the more tolerant modules.

The bus architecture can have two or more secondary buses, each one connected to the primary bus via a separate primary to secondary interface module.

The primary and/or secondary bus may comprise:
a write data bus for transferring write data between modules;
a read data bus for transferring read data between modules;
a transaction bus for transferring control data between modules,
the read data bus and the write data bus being physically separate from one another.

With such an architecture, a read transaction by a master module can typically involve placing read address data indicating the location of the required data on the transaction bus to which the master module is connected, and the master module receiving the required read data from a target module on the read data bus to which the master module is connected at an arbitrary time after the read address has been placed on the transaction bus, wherein the write and transaction buses are available for use during reception by the master module of the return read data.

The apparatus may further comprise:
means for assigning each module in the system one of a predetermined number of priority levels;
means for assigning each module an initial position within a queue;
means for receiving respective transaction requests from modules;
means for filtering the transaction requests from the modules so as to retain the requests from those modules having the highest priority level of the modules making such requests, thereby producing a set of filtered requests;
means for selecting from the set of filtered requests, the transaction request from the module having the highest position within the queue, and
means for sending a request grant message to the module from which the selected transaction request was received.

The number of modules will typically exceed the predetermined number of priority levels.

The apparatus preferably also includes means to place a module receiving a transaction grant message at the bottom of the queue.

The apparatus can also include a first arbiter means for controlling initiating transactions on the bus architecture; and a second arbiter means for controlling return transactions on the bus architecture.

When the primary and/or secondary bus includes separate read, write and transaction control buses, the first arbiter means preferably controls use of the write and transaction buses and the second arbiter means preferably controls use of the read bus.

In apparatus-embodying the invention, each module can be assigned an address range in a memory map of the apparatus, and the apparatus can then further comprise:
reception means for receiving and storing availability data indicative of the availability of modules;

transaction request means for producing a transaction request including target address data indicating a target location in the memory map for the transaction;

decoding means for decoding the target address data to produce identity data relating to a target module, the target module being assigned an address range in the memory map which includes the target address data;

comparison means for analysing the stored availability data corresponding to the target module identified by the identity data; and transaction means, responsive to the comparison means, for terminating the transaction request if the analyzed availability data indicates that the target module is unavailable.

Such apparatus can further comprise a control means for controlling access to the bus architecture by the modules and wherein the transaction means is operable to forward the transaction request to the control means, if the analyzed availability data indicates that the target module is available.

Apparatus embodying the invention can also comprise:

means for receiving data requests from modules for respective required data packets, each request including address data indicating the location of the data packet concerned, and sequence data indicating the timing of the request relative to other data requests;

means for receiving returned data packets and associated sequence data;

a storage device for storing the returned data packets in respective storage locations therein, in the order indicated by the associated sequence data; and retrieval means for retrieving data packets from the storage device in the order of the storage locations of the storage device.

The retrieval means can be operable to cycle through the storage locations of the storage device.

The storage device can be provided by a dual port RAM device.

Apparatus embodying the invention can also further comprise:

a storage device;

means for receiving read transaction requests from modules, each request including address data indicating the location of the data to be retrieved, and identity data indicating the source of the transaction message;

means for sending the address data to the storage device;

means for storing the identity data in a queue;

means for receiving a retrieved data item from the storage device;

means for matching the retrieved data item with the identity data at the front of the queue; and means for returning the retrieved data to the module identified by the matched identity data.

Apparatus embodying the invention can also comprise:

an arbitration unit for granting access to the bus in response to requests received from the modules, the granting of access being in the form of a dedicated data packet issued from the arbitration unit, whereby only the module which has been granted access can use that particular dedicated packet to gain access to the bus, the arbitration unit being operable to issue empty data packets during periods when the bus is idle, the empty data packets being usable by a module to gain access to the bus without making a specific request to the arbitration unit for a dedicated packet.

In such apparatus the first module to use the empty packet gains access to the bus. Each module may have means for converting a dedicated packet intended for itself into an empty packet. The arbitration unit may be located at one end of the bus.

In apparatus embodying the invention the or each bus may also comprises:

a plurality of bus connection units for connecting modules to the bus concerned; and a plurality of bus portions arranged in series, each bus portion, except the last in the series, being connected to the next portion in the series by way of a bus portion connection unit.

Each bus connection unit may include multiplexer circuitry for selectively connecting a module to the bus concerned. Each bus connection unit may include output circuitry connected to the bus portions to which the unit is connected, the output circuitry being optimised for the length of the bus portions concerned. Preferably, the bus portions are all substantially equal in length.

Embodiments of the invention are usefully implemented in a computer system, an integrated circuit, a graphics processing system, or a games console including apparatus as set out above.

BRIEF DESCRIPTION OF THE DRAWINGS

For a better understanding of the present invention, and to show more clearly how it may be carried into effect, reference will now be made, by way of example, to the accompanying drawings, in which:—

FIG. 14 illustrates priority level assignments used in the scheme of FIG. 13;

FIGS. 15 to 19 illustrate register entries for the method of FIG. 13;

FIG. 21 illustrates transaction implementation using the arbitration unit of FIG. 20;

FIG. 22 shows an arbitration unit for an apparatus for use in a computer system;

FIG. 23 illustrates a bus structure for use with the arbitration unit of FIG. 22;

DETAILED DESCRIPTION

Apparatus used in computer systems typically use a communications bus architecture, or data pipe to interconnect modules of the computer system. In this disclosure, a "module" means a functional unit that connects to the bus, and that provides a particular function for the computer system. A module is usually able to transfer data to and from other modules in the system, and such a transfer of data is known as a "transaction". A module that initiates a transaction is known as a "master module" and a module which is the subject of a transaction is known as a "target module". In order to initiate a transaction, a master module issues a "transaction request" to an arbitration unit (or "arbiter") which determines how access to the bus will be controlled. A "data packet" is defined as a predetermined number of data bytes, for example 32, which is used for transferring data across the bus architecture. A write bus is a bus which is used for transferring data packets to be stored at a target module, and a read bus is a bus used for transferring so called "mature data" to a master module in response to a read transaction. "Mature data" is data which is ready to be returned from a target module to a master module in response to a read transaction. A "system cycle" is defined as one clock period of the system clock, and a "pipeline stage" is defined as the bus length travelled by a data pulse in a single system cycle.

It will be readily appreciated that the bus architecture and features described below may be used in a computer system including individual components connected to one another by external interfaces, or in an integrated circuit (on-chip) system in which modules are formed on a single integrated circuit, or in a combination of the two. Preferably, such a system involves the use of an integrated circuit (on-chip) system.

Primary and Secondary Bus Architecture

Figure 2:
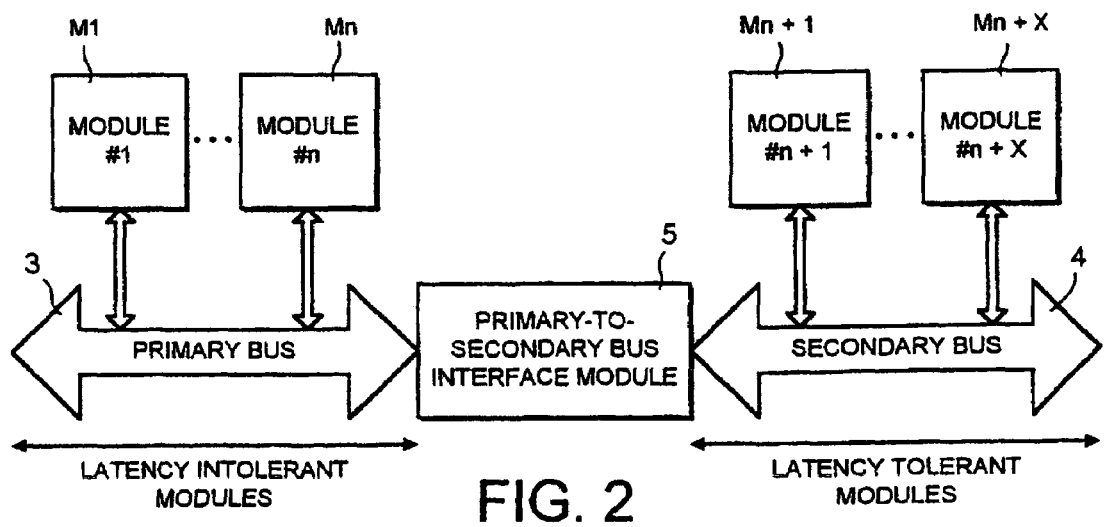
FIG. 2 shows an apparatus having a different bus architecture for use in a computer system.

FIG. 2 illustrates a computer system including an improved bus architecture which comprises a primary bus 3 and a secondary bus 4. The primary bus 3 has a plurality of modules $M_1 \ldots M_n$ connected thereto. Each module connected to the primary bus 3 is a latency intolerant module.

The secondary bus 4 also has a number of modules $M_{n+1} \ldots M_{n+x}$ connected thereto. However, each module connected to the secondary bus 4 is a latency tolerant module. The primary bus and secondary bus are interconnected by an interface module 5, known as a primary to secondary bus interface module S.

In this manner, modules which are expected to operate at relatively high speed, (i.e. the latency intolerant, or sensitive modules), are connected to a dedicated primary bus 3 that can service their speed requirements. Latency intolerant modules cannot wait for incoming data, and typically make frequent requests for relatively small amounts of data.

Latency tolerant, or latency insensitive, modules are connected to the secondary bus 4. These modules are prepared to wait for data, and typically make infrequent requests for relatively large amounts of data.

Figure 3:
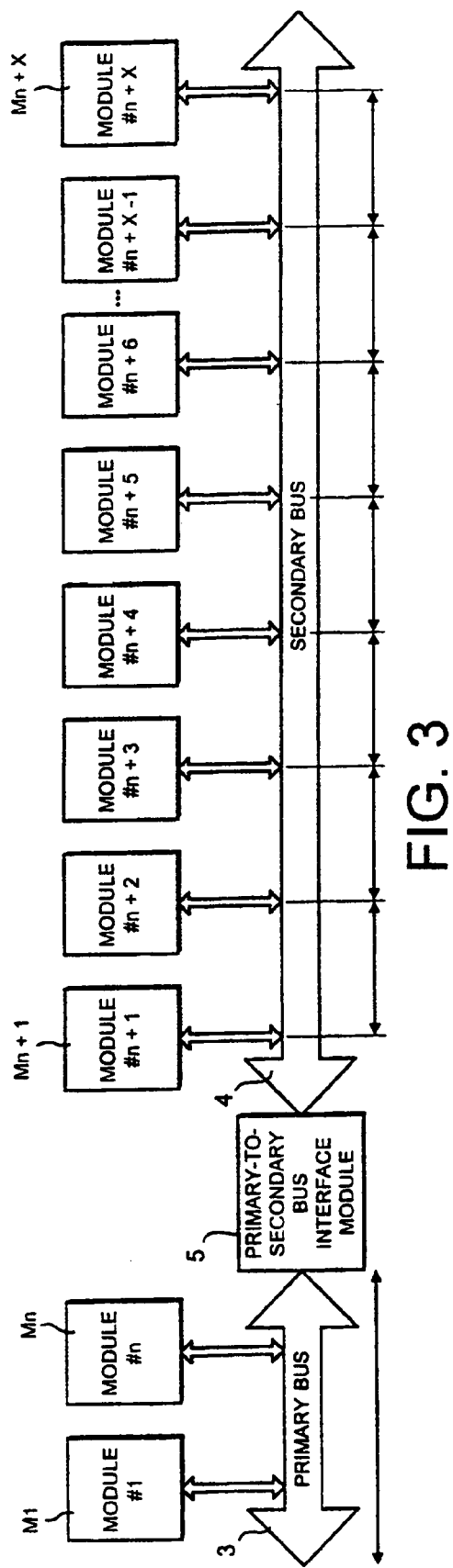
FIG. 3 illustrates in more detail the apparatus of FIG. 2.

FIG. 3 shows a more detailed view of the computer system of FIG. 2. The primary bus is preferably only one pipeline stage in length. Therefore, if two modules are connected by a single pipeline stage, a signal will travel between the two modules during a single clock cycle. Similarly, if a connection between two modules is two pipeline stages long, two clock cycles will be required for the signal to travel from one module to another.

Since all the modules connected to the primary bus are less than one pipeline stage apart, the primary bus guarantees that data transfer between any two modules on the primary bus is always less than one clock cycle.

The secondary bus, on the other hand, can be of any length, and can be expected to be much longer than the primary bus. The secondary bus is made up from a plurality of pipeline stages. Thus, the secondary bus cannot guarantee a minimum transaction time between a master and a target module. For example, in FIG. 3, module $M_{n+x}$ is seven pipelines away from module $M_{n+1}$. Therefore, data transfer between modules $M_{n+x}$ and $M_{n+1}$ will take seven clock cycles. Although FIG. 3 shows the modules separated at intervals of approximately one pipeline, they may be several pipeline stage apart, or several modules may be arranged within a single pipeline stage.

The interface module 5 serves as a collation point for all incoming and outgoing requests to/from the secondary bus. The primary to secondary interface module 5 has a first-in-first-out register (FIFO) to hold outgoing requests before they can be accepted on the primary write bus.

Preferably, the interface module 5 includes a FIFO capable of holding a fixed number of pending read and/or write requests. The FIFO should be sufficiently large to hold enough requests to keep the primary bus active should the interface module 5 be allowed to make consecutive requests, but small enough such that it is not an overhead. Typically, the FIFO will consist of x entries of n bits (ie. data and transaction information).

Figure 4:
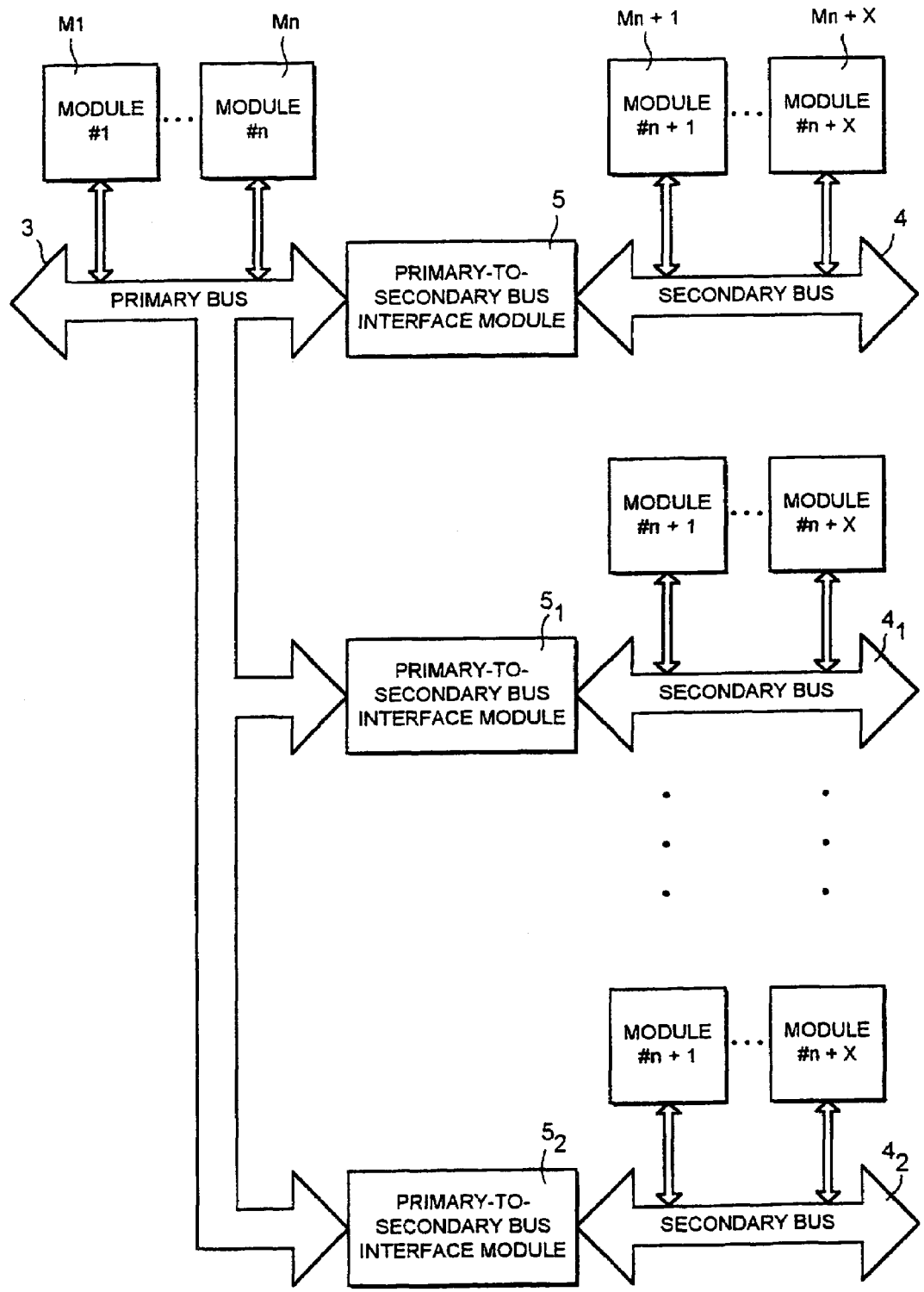
FIG. 4 shows an apparatus having a further different bus architecture for use in a computer system.

A modification of such a bus architecture provides a plurality of secondary buses. FIG. 4 shows an arrangement whereby a plurality of secondary buses 4, $4_1$ and $4_2$ are connected in parallel. Each secondary bus has a corresponding secondary to primary interface 5, $5_1$ and $5_2$ for connecting each secondary bus to the primary bus 3.

The provision of a number of secondary buses in parallel is advantageous when there are too many modules to connect to a single secondary bus.

Although the primary bus has been described as being just one pipeline stage in length, the primary bus could still provide the required latency sensitivity if it is two, or perhaps three pipeline stages in length. However, it is unlikely that a practical embodiment of a system utilising a split primary-secondary bus would use a primary bus having more than a single pipeline stage.

Split Read-Write Buses

Figure 1:
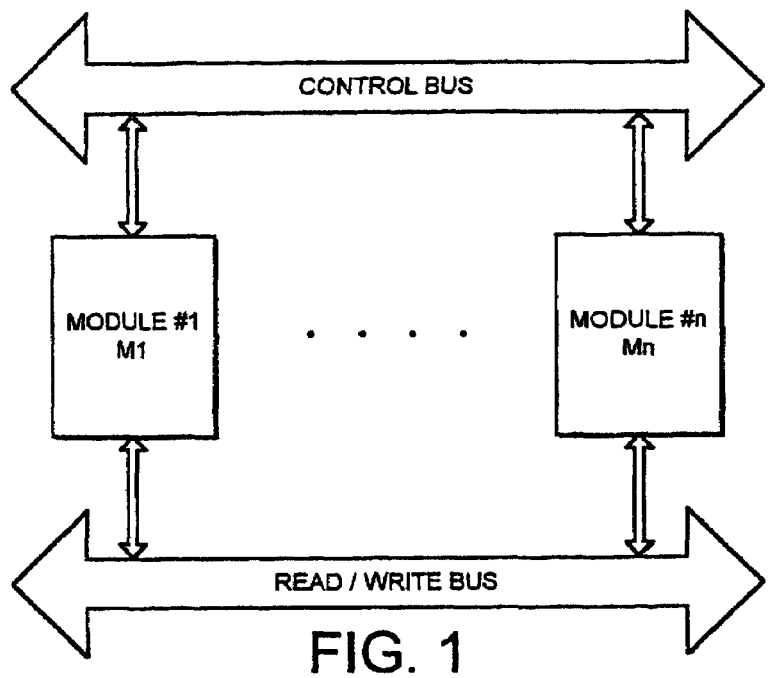
FIG. 1 shows an apparatus having a known bus architecture for use in a computer system.

In the known bus system of FIG. 1 described above, the integrated tristate read and write data bus has the disadvantage that a read transaction from a master module involves placing the address to be read on an address bus, and then awaiting the data which has been read from the target module to return on the combined read/write data bus. This wait for the read data to be returned on the data bus ties up the bus activity. Other modules wishing to make transactions are unable to gain access to the bus. Furthermore, when changing from a write transaction to a read transaction, (known as turn around), valuable processing time is lost.

Using a split transaction procedure can overcome this problem, since a read transaction can adopt a "fire-and-forget" approach. This means that the read data is returned at some arbitrary time after the read address is issued.

However, the combined read and write bus is still tied up while the read data is returned.

To overcome this problem, the read and write bus can be split into separate read and write buses. In this manner, read data is returned on a dedicated bus, which means that the write data bus and transaction bus are available to carry out further transactions. A benefit of this architecture is that the read latency does not consume bus time, as happens on a conventional bus which is frozen while the read cycle is serviced.

Figure 5:
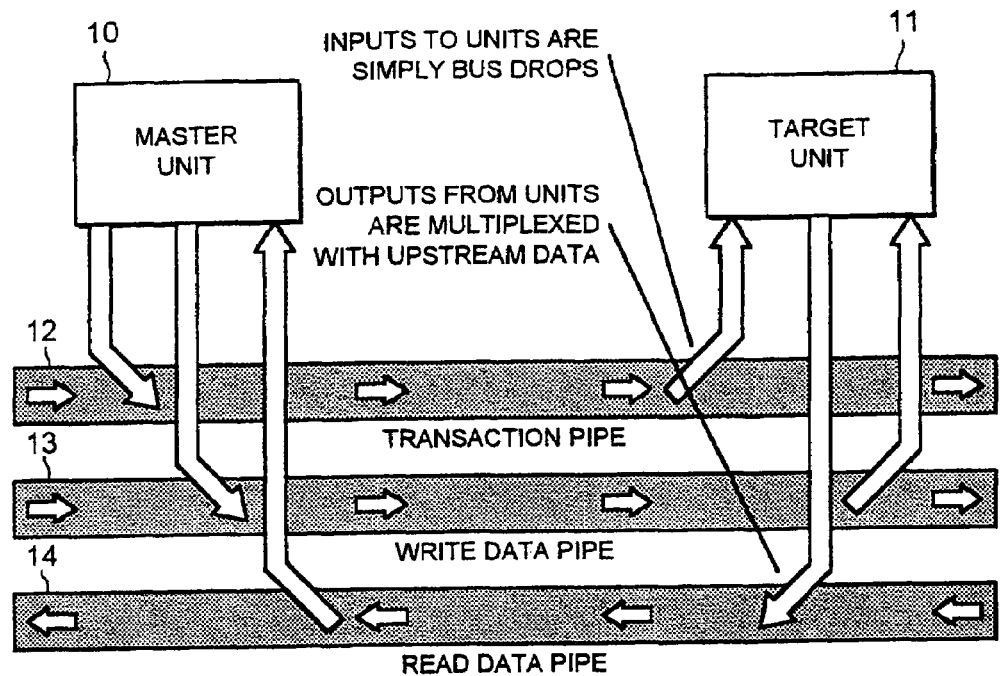
FIG. 5 illustrates an apparatus having a further different bus architecture for use in a computer system.

FIG. 5 shows a split read/write bus. Each module is connected to a write data bus 13 and a read data bus 14. A transaction bus 12 controls data transfer between any two modules 10, 11. If a data rate of 3.2 GB/s is required, and the operating frequency is 200 MHz, a 128 bit path will be needed to sustain this bandwidth.

This approach removes the need for tri-state buses, since each module is "tapped" as a simple connection, or by way of a multiplexer which drives the segment of bus up to the next module. This makes the entire structure point to point with no tri-state drivers being required. The transaction bus 12 is provided for information pertaining to the read and write transactions, for example address traffic. This bus runs in parallel with the write data bus 13, and flows in the same direction. The transaction bus 12 can initiate a transaction every clock cycle at 200 MHz to fit the natural data size of the external interfaces. A single transaction consists of a packet of typically 32 data bytes. Larger transfers are always split into packet transactions which are independently arbitrated. The data bus width is chosen to be typically 128 bits (or 16 bytes). This means that a transaction takes two cycles to process on the read or write data buses.

Since read transactions can be initiated every second cycle, and write transactions likewise, the transaction bus 12 can alternate initiations of read and write transactions on each alternate cycle, and keep both data buses saturated. In this way, such a bus structure can support, for example, up to 3.2 GB/s of read traffic and up to 3.2 GB/s of write traffic simultaneously. In addition, consecutive read transactions are also allowed, in the absence of any write transactions requests.

Figure 6:
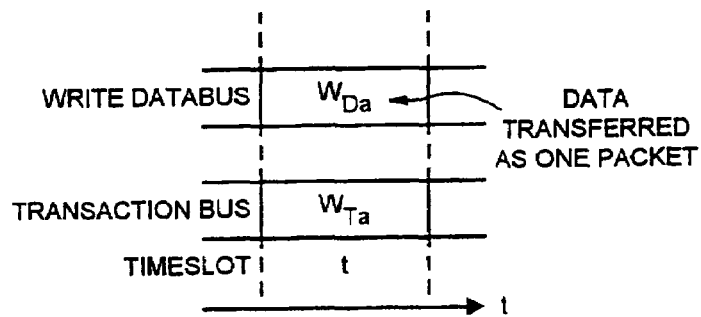
FIGS. 6 and 7 illustrate data transfer during write transactions in the apparatus of FIG. 5.

FIG. 6 shows data transfer on the write data bus 13 where data is transferred as one packet. In one cycle, t, information pertaining to the write data (i.e. address, master ID tag, master sequence tag) $W_{Ta}$ is placed on the transaction bus 12 and the write data $W_{Da}$ is placed on the write data pipe.

Figure 7:
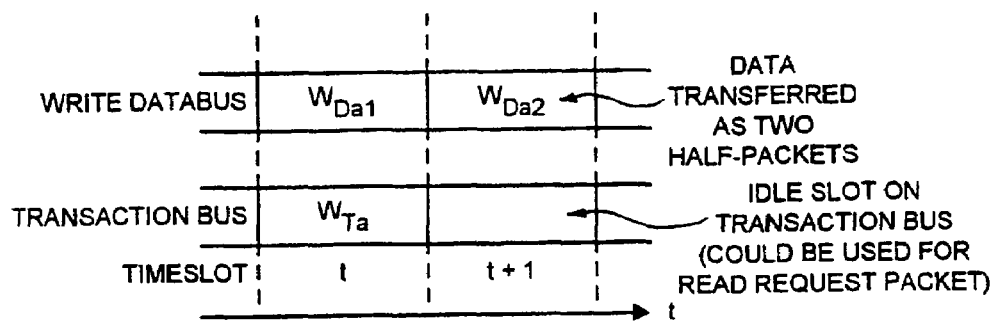

FIG. 7 shows an alternative whereby the transfer of data takes place over two cycles. In cycle t, the write address information $W_{Ta}$ is placed on the transaction bus 12 and the first half of the data is placed on the write data bus 13. During cycle t+1, the second half of the write data packet is placed on the write data bus 13. This leaves an idle slot on the transaction bus 12, which could be used to request a read packet.

Figure 8:
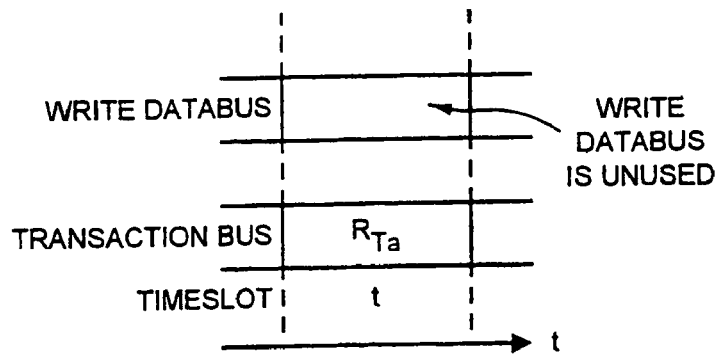
FIGS. 8, 9 and 10 illustrate data transfers in read transactions in the apparatus of FIG. 5.

FIG. 8 shows that when a read request packet is made, the transaction bus 12 conveys the information $R_{Ta}$ regarding the data-fetch (address etc.). During such a request, the write data bus 13 is empty.

Figure 9:
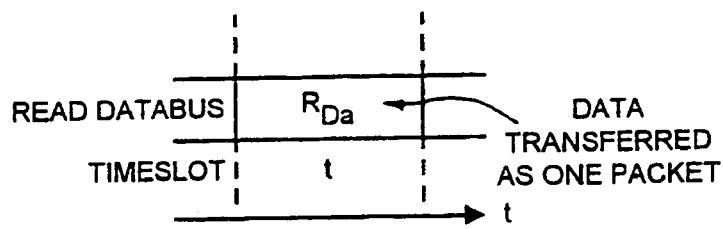
Figure 10:
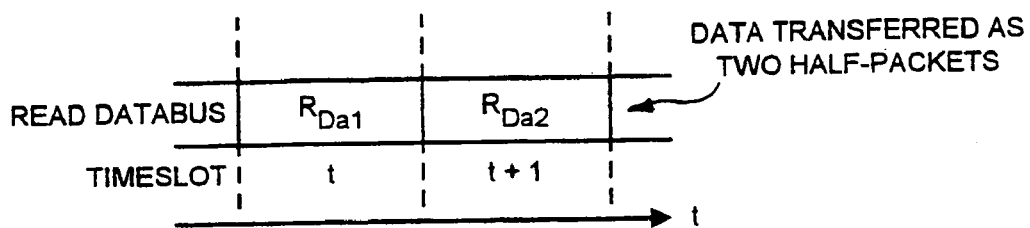

The read data pipe 14 is used by target modules to send data to the master modules in response to Read requests as shown in FIG. 8. FIG. 9 shows how the read data bus can convey the data from the target to the master in one clock cycle, t.

Alternatively, if only a half-size data bus is used, the read data is conveyed over two cycles, t and t+1.

An advantage of partitioning the bus into separate transaction, write and read buses, is that it is possible to reduce latency problems in a latency sensitive environment. Furthermore, there is no need to rely on tri-state schemes that are complex to control.

Arbitration Scheme for Bus Access

In a computer system such as those described above, which include more than one module, some form of arbitration is required to decide which of the modules is to be allowed access to the communications bus at any one time.

Figure 11:
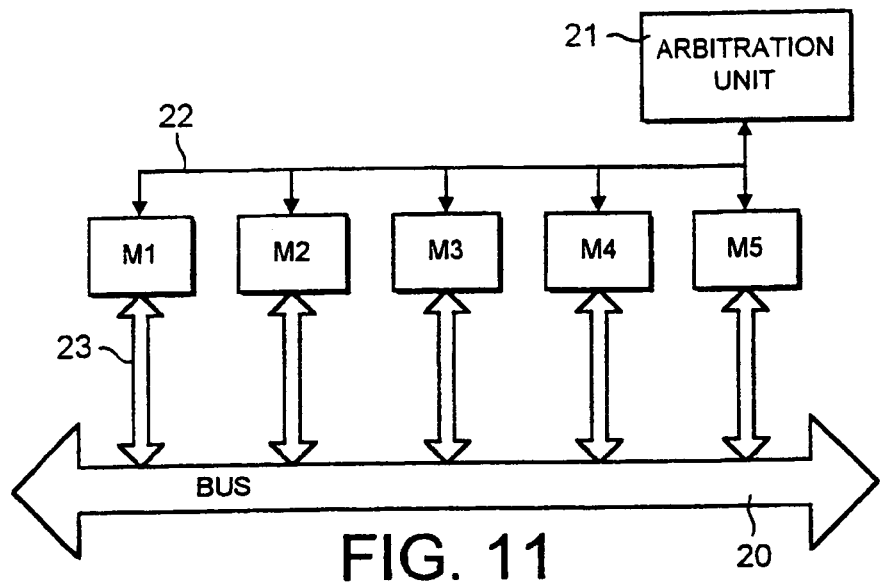
FIG. 11 illustrates an apparatus incorporating an arbitration unit for use in a computer system.

FIG. 11 illustrates such a computer system, in which five modules M1 to M5 are connected to a communications bus 20 and also to an arbitration unit (or arbiter) 21. It will be appreciated that the communications bus is preferably in accordance with those described with reference to FIGS. 2 to 10 above, but that the arbitration scheme is applicable to any bus architecture.

The arbitration unit 21 communicates via control lines 22 with the modules M1 to M5, and the modules communicate with the bus 20 via links 23. In general terms, a transaction is completed as follows: the arbitration unit 21 receives a transaction request from a module (the "master" module for the transaction), and if the bus is available to that module, then the arbitration unit 21 returns a transaction grant message. The master module concerned then places data on to the bus. For example, using the split read/write/transaction bus described above, if module M1 is to undertake a write transaction, it requests use of the write bus by sending a write transaction request via control lines 22 to the arbitration unit 21. The arbitration unit 21 decides whether the master module M1 is able to use the write bus, in accordance with the method to be explained in more detail below. If the master module M1 is able to use the write bus, the arbitration unit 21 issues a transaction grant message to the master module M1 and a transaction granted message to the target module. Upon receipt of the grant message, the master module M1 supplies address data on the transaction bus and corresponding write data on the write bus. The target module then receives the address and write data from the bus and processes the data appropriately.

Figure 12:
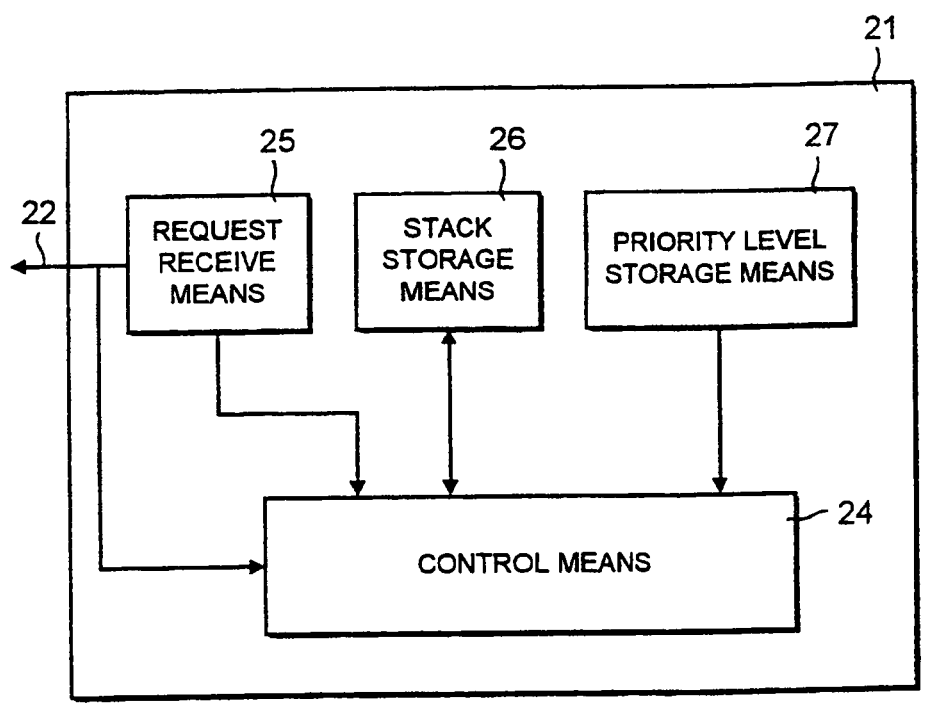
FIG. 12 is a block diagram illustrating the arbitration unit of FIG. 11.

FIG. 12 is a block diagram illustrating an arbitration unit 21 for use in the computer system of FIG. 11. The arbitration unit 21 includes a control means 24 for carrying out the arbitration scheme, a request receive means 25 for receiving transaction requests from modules in the computer system, priority level storage means 27 for storing information indicating an assigned priority level for each of the modules in the system, and stack storage means 26 for storing stack (or queue) information relating to the modules in the system.

Figure 13:
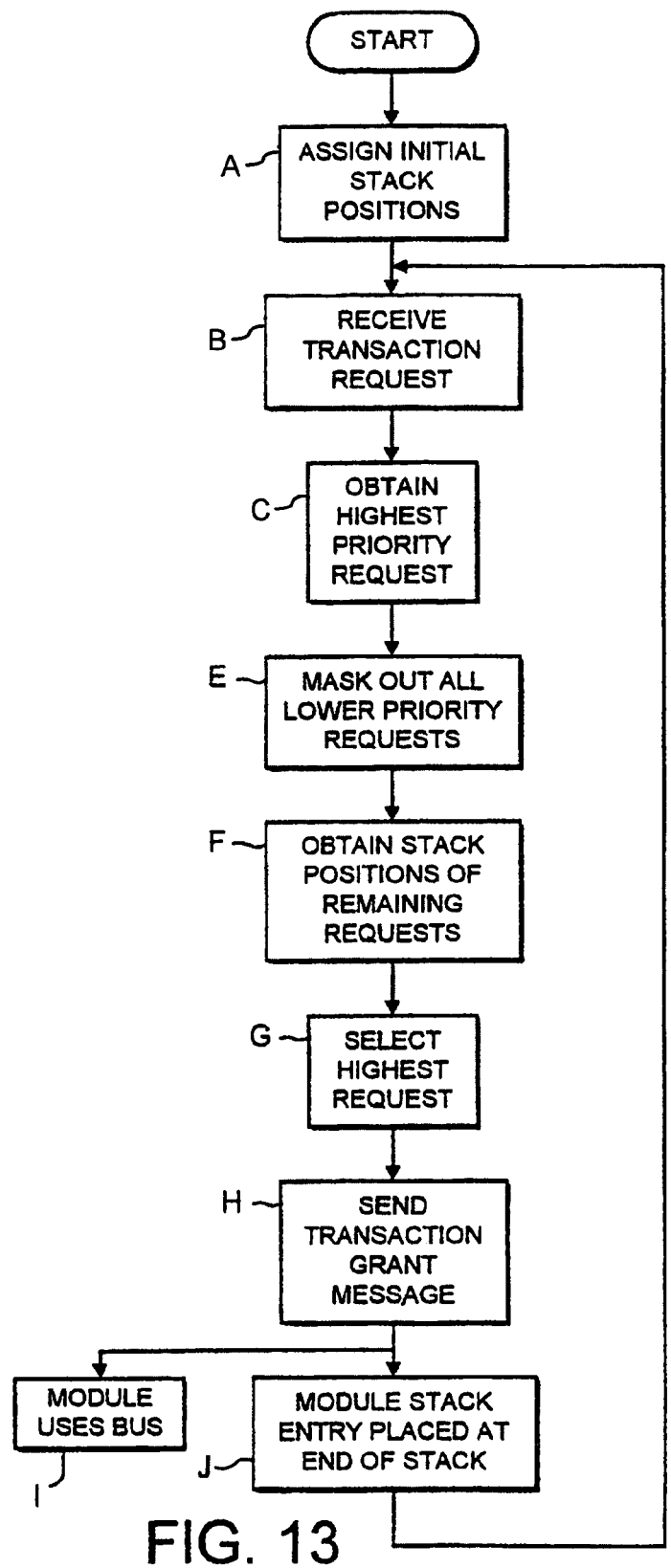
FIG. 13 is a flow chart illustrating a method of bus arbitration for the apparatus of FIG. 11.

An arbitration scheme will now be described with reference to the flow chart of FIG. 13 and the register charts of FIGS. 14 to 21. The arbitration scheme to be described can be used for the read and write buses together, or individually. The result of the arbitration scheme determines which of the modules M1 to M5 is granted use of the bus concerned.

Each module M1 to M5 is assigned a relative priority level. In the example shown in FIG. 14, modules M1 and M4 are assigned a high priority level, modules M2 and M5 a medium priority level and module M3 a low priority level. The priority levels are stored in the priority level storage means 27 in the arbitration unit 21.

The initial set up of the arbitration scheme is to arrange the modules into initial stack positions (step A) which are stored in the stack storage means 26. These initial positions are illustrated in FIG. 15. It will be appreciated that the initial stack positions are arbitrarily chosen. In the example shown, M1 is at the top of the stack and M5 at the bottom.

In step B, the arbitration unit 21 receives respective transaction requests from any number of the modules M1 to M5. For example, all five modules may wish to make transaction requests at the same time. The transaction requests are received by the request receive means 25 and are forwarded to the control means 24. At step C, the control means 24 determines which of the transaction requests are associated with the highest priority level of the modules issuing requests. In the example where all five modules M1 to M5 issue transaction requests, modules M1 and M4 can be seen to have the highest priority levels of the requesting modules. The control means then masks out (step E) all requests from lower priority modules. Thus, only the requests from modules M1 and M4 are processed further. This is illustrated in FIG. 16.

The second stage of the arbitration scheme is to determine the stack positions (step F) of the modules whose requests are to be processed further. The transaction request from the module occupying the highest position in the stack is selected for acceptance (step G).

This is illustrated in FIG. 17 in which it can be seen that the module M1 is at a higher position in the stack than the module M4, and so the request from module M1 is accepted over that from module M4. In step H, a transaction grant message is then sent to the selected module (M1 in this example) so that the module can use the bus in the prescribed manner (step I).

Figure 18:
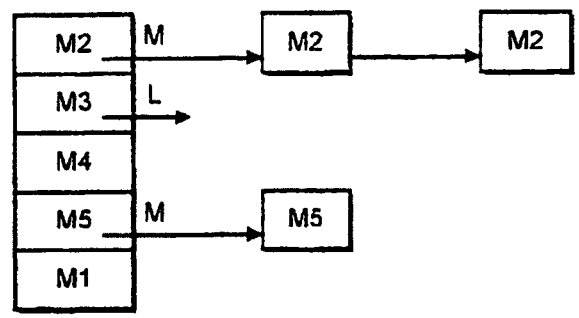
Figure 19:
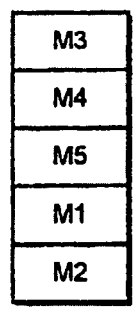

The entry in the stack relating to module M1 is then moved (step J) to the bottom of the stack, and the entries corresponding to the remaining module M2, M3, M4 and M5 move up the stack as illustrated in FIG. 18. The arbitration scheme is then used again with the new stack position when the next request or requests are received from the modules.

For example, as shown in FIG. 18, if modules M2, M3 and M5 issue transaction requests together, the first stage of the arbitration scheme selects M2 and M5, since these two modules have the highest assigned priority level of the requesting modules. The second stage of the arbitration then selects the request from module M2 since module M2 is at a higher position in the stack than module M5. Module M2 is then moved to the bottom of the stack, resulting in the stack shown in FIG. 19, with module M3 at the top of the stack followed by M4, M5 and M1 with the module M2 at the bottom.

In the particular bus architecture described above, using primary and secondary buses and split read, write and transaction buses, the primary write bus arbitration scheme as described functions over two clock cycles which allows sufficient time to gather transaction requests from master modules, to arbitrate as described, and to issue transaction grant message to the successful master module and its target module.

In, for example, a graphics system, there can be five possible master modules which can require use of the write data bus. These are the processor, the graphics controller, the interface controller between the primary and secondary bus system, the advanced graphic port, the PC component interconnect and the memory, ie. RAM bus connection. There are three possible target modules, the PC component interconnect, the advanced graphic port and channels 0 and 1 of the memory, ie. RAM. In such a system, all masters except the processor have entries in the stack system in order to maintain the fairness during arbitration. The processor is assigned the highest priority of all of the master modules making requests, and therefore need not be included in the stack, since whenever the processor makes a request for bus usage, the bus is assigned to the processor.

Preferably, the priority level assigned to each of the modules in the stack can be individually programmed (either during design, or by the user), for example by assigning an appropriate two-bit code for each module. For example, a two bit coding scheme provides three priority levels; low, medium and high; as well as a disabled level in which no requests are granted to the module concerned.

When a master module wishes to make a request, it transmits its request signal together with the information concerning the target module and whether a read or write transaction is to be performed. As described above, incoming requests are assessed firstly according to their incoming priority level and secondly according to their position within the stack. It is therefore possible to maintain an order of fairness when granting the requests.

Dual Arbitration Units—Dual Transaction Arbiters

Figure 20:
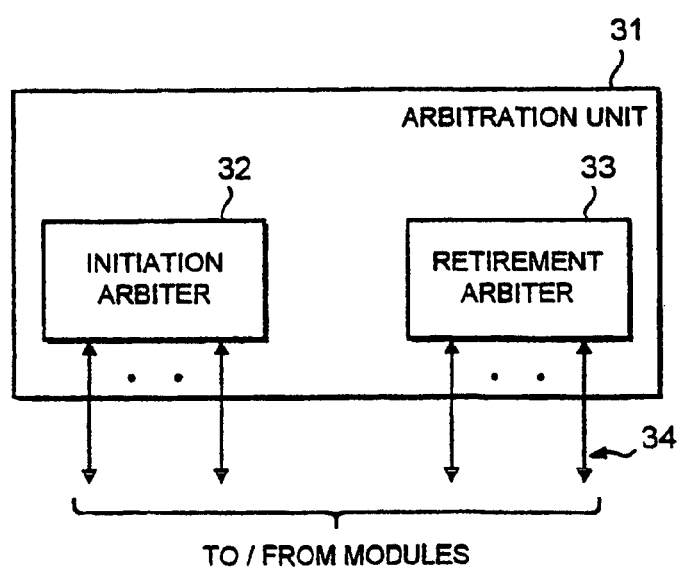
FIG. 20 illustrates an arbitration unit for an apparatus for use in a computer system.

A system can be implemented using an arbitration unit which contains two separate arbiters. FIG. 20 illustrates an arbitration unit 31 for use in a computer system using separate transaction, write and read buses. The arbitration unit 31 is linked to the modules (not shown) of the system in order to control access to the bus. Requests to the arbitration unit and grant signals are carried by control lines 34.

The arbitration unit 31 contains an initiation arbiter 32 and a retirement arbiter 33. Each of the arbiters within the arbitration unit are connected to the modules. It will be appreciated that many modules can be connected to a single arbitration unit.

The initiation arbiter 32 is concerned with initiating (or launching) read and write transactions on the transaction bus or on the transaction and write data buses, respectively. For a read transaction, the initiation arbiter 32 will grant use of the transaction bus to a master requesting read data. The use can be granted on the basis of the arbitration method described above, or on any other basis.

A write transaction, requires simultaneous use of both the transaction and write buses for a single cycle.

The retirement arbiter deals with read data when it arrives back from a target module. Multiple targets may mature read data in the same cycle, and so arbitration of the read data bus is controlled separately from the transaction and write data bus. The retirement arbiter 33 receives transaction requests from target modules holding mature data and assigns use of the read bus in an appropriate way, for example as described above.

The read data will take time to "mature" at the target and then appears on the read data bus at some indeterminate time in the future after the read request has been made.

Since the two arbiters 32 and 33 operate independently, the transaction bus can be fully utilised, by using the vacant clock cycle associated with a write data transaction to issue a read transaction on the transaction bus. This is illustrated in FIG. 21. The transaction bus is ideally alternated between read and write states so that the write data bus is also fully utilised carrying the two packet write data packets.

The initiation arbiter is able to receive requests and grant bus use within a single clock cycle. When a module is granted the use of the transaction bus the transaction address data is placed on the transaction bus, and, for a write transaction, write data is placed on the write bus. On the next clock cycle, a read transaction can be initiated from the same module or from a different module. This means that transactions must not be initiated to targets that cannot respond to them on that cycle or the transaction will fail. A method is described in more detail below, in which it is possible to determine whether a target is able to accept a transaction, before the transaction is requested.

In addition, multiple modules may request read data from a single target. Therefore each maturing data packet must be retired (returned) back to the master which requested it. To do this, each target maintains a list of outstanding read transactions. Preferably this is implemented in the form of a first-in-first-out (FIFO) register having a size equal to the maximum number of read transactions that can be processed. Identification data tags can be used and associated with the requests so that the returning data can be identified. Such a system will be described in more detail below.

When read data matures in a target, it requests the retirement arbiter for use of the read data pipe line. When the use is granted, it outputs both the data packet and the master ID tag from the transaction data store. The retirement arbiter asserts a strobe to the master unit which originally requested the data so that master unit can consume that data. An important assumption in an ideal system is that the master is able to consume immediately any data packet which it has requested.

Arbitration for the read bus can be similar to that for the write bus but can be simplified if each master module is able to accept the matured read data as soon as it is made available. A similar two-stage filter and stack arbitration system can be used to arbitrate between the various sources of read response data, and no interaction is required from the write or transaction buses. The read data transfer is achieved over two cycles (two half packets). Once again, the priorities could be programmable, but in a preferred example, the priorities are fixed. When mature data is ready at a target, that target module indicates to the read arbiter that it wishes to send data to a particular master module. Use of the read bus is then controlled by the retirement arbiter.

Dual Arbiters for Split Read/Write Buses

Figure 24:
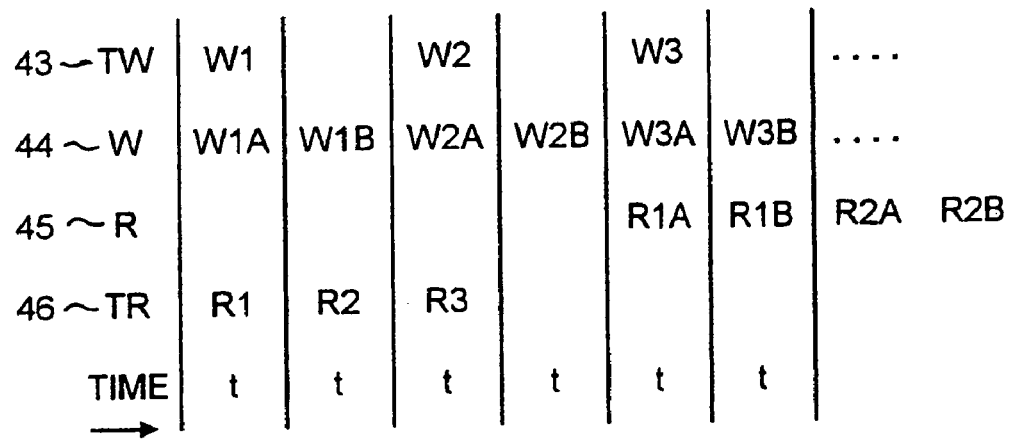
FIG. 24 illustrates transaction implementation using in the arbitration unit of FIG. 22.

An alternative arbitration unit includes separate write bus and read bus arbiters, for example as illustrated in FIG. 22. In such a case, the bus preferably includes two transaction buses-one for read and one for write. Such a system is illustrated in FIG. 23 where the transaction bus TW 43 is associated with the write data bus W 44 and the read transaction bus TR 46 is associated with the read data bus R 45. As illustrated in FIG. 24, since the read and write data buses 44 and 45 and the read and write transaction buses 43 and 46 are entirely separate, then it is possible to perform simultaneous independent read and write operations.

Address Decoding

As described above, in a computer architecture employing a bus system and multiple modules connected to that bus system, some form of arbitration is required to determine which of the modules can have access to the bus system. Preferably, the computer system is defined by a memory map in which respective address ranges are allocated to individual modules. In such a system, each module can address the other modules simply by using a single address value. Thus, if module M3 wishes to write data to a particular address, it simply issues address data equivalent to that address. This address data needs to be decoded to determine the target module identity. Preferably, each module M1, M2 and M3 supplies information to all the other modules indicating when it is busy (i.e. unavailable for transactions).

Figure 25:
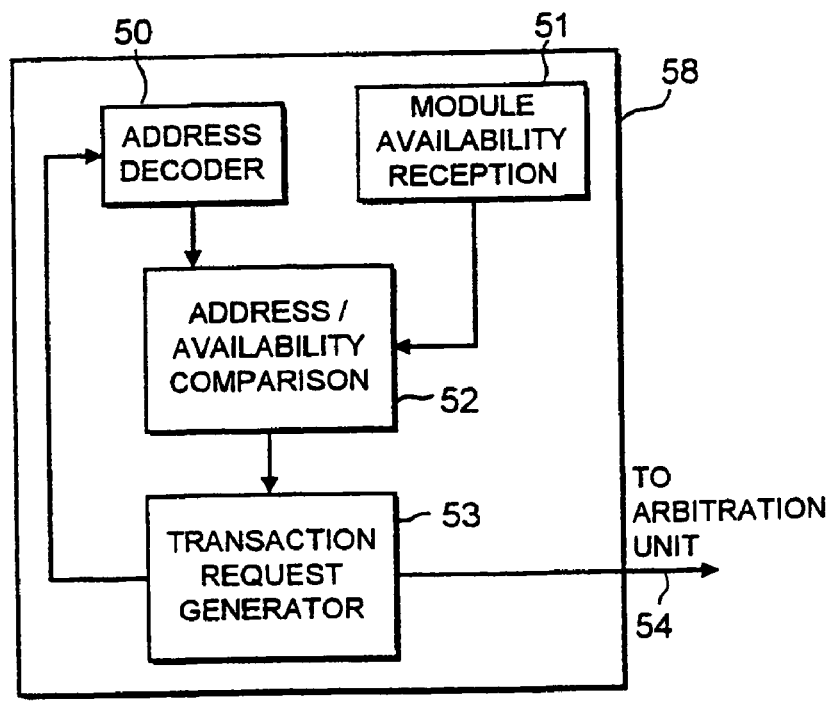
FIG. 25 illustrates an address decoding apparatus.
Figure 26:
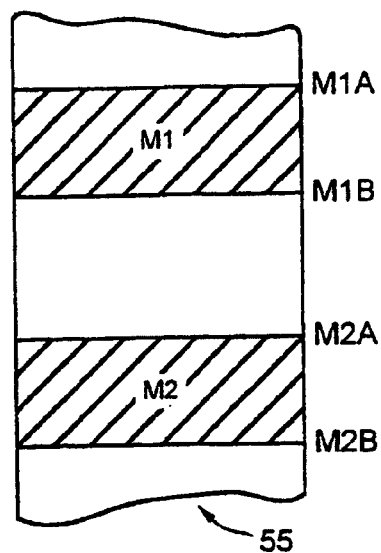
FIG. 26 illustrates a memory map of a computer system.

An example of a suitable decoding arrangement 58 is shown in FIG. 25 and comprises a transaction request generator 53, for producing transaction requests, an address decoder 50, a module availability reception and storage means 51, and an address/availability comparison means 52. The operation of these units will be described with reference to FIGS. 25, 26 and 27. FIG. 26 illustrates the memory map space for the computer system and it shows the address regions assigned to modules M1 and M2. The address regions are bounded by specific addresses M1A and M1B for module 1, and M2A and M2B for module 2.

When module M3 wishes to perform a transaction with module M1, for example, module M3 generates a transaction request including target address data. The address decoder means 50 receives the target address data. The address decoder 22 operates to determine which of the modules M1 and M2 is assigned the address region into which the target address data falls.

Figure 27:
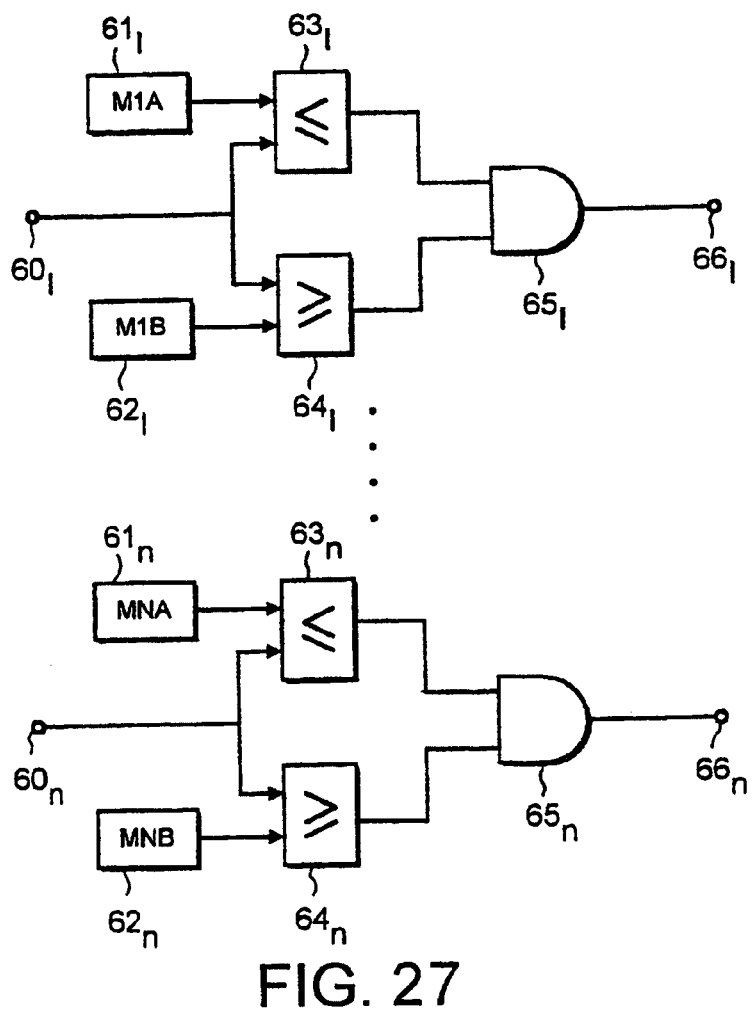
FIG. 27 illustrates an address decoder.

A specific implementation of the address decoder is shown in FIG. 27 and will be described in more detail below.

The result of the address decoding is supplied to the address/availability comparison means 52. The module availability reception means 51 receives and stores information indicating whether the modules M1, M2 and M3 are busy or able to receive a transaction request. The address/availability comparison means uses the decoded address information and the relevant stored module availability data to determine whether the intended target is able to accept the transaction. If the availability information corresponding to the decoded address signal indicates that the module concerned is unavailable, then the requested transaction is halted until it is available. However, if the signal indicates that the module concerned is available to receive a transaction, then the transaction request is forwarded to the arbitration unit.

In this way, the arbitration unit can only be provided with requests that are made for available modules.

FIG. 27 illustrates one possible implementation of the address decoder 50. The decoder 50 includes registers 61 and 62 for storing respectively the upper and lower boundary address values of a particular module, In the examples shown, the upper value M1A of module M1 is stored in register 61 and its lower value M1B is stored in register 62. A comparator 63 compares the upper value with the incoming address 60 and outputs a high signal if the address is less than the value given by MIA. Similarly, a comparator 64 outputs a high signal if the incoming address 60 is greater than or equal to the lower value M1B. The outputs of the comparators 63 and 64 are combined by an AND gate 65 such that if the incoming address is greater than or equal to the lower value M1B and less than the upper value MIA, then a high output is supplied at 66. If, however, the address signal indicates that the required address is outside of this range, then the output 66 is low. Thus, only the selected 66 is high.

The decoding arrangement can thus effectively provide pre-arbitration stage, which only allows arbitration of those transaction requests which are most likely to be successful if granted. Any transaction request which specifies a target which is already known to be busy, it will simply not be forwarded to the arbitration unit.

In an alternative arrangement to the above, availability information could be sent to an arbitration unit, and used within the arbitration process in granting access to the bus (that is, the module availability reception and storage means 51 and the address/availability comparison means 52 shown in FIG. 25 could be located within an arbitration unit).

Data Packet Reordering

A complication can arise if a master module requests read data from two or more targets that supports bit transactions. In such a case there is the possibility that data may mature from the targets in a different order from that in which it was requested. The master module could then receive data packets in the wrong order. This problem, as will be described in more detail below, can be solved by providing transaction tag register in each target so that module ID code and a transaction sequence code can be utilised for that module. A sequence code is generated by each module from, for example, an end bit counter, which is incremented whenever the module concerned is granted a read transaction. Thus, when read data is matured in a target and returned (or retired) back to the requesting master, it has an associated sequence code transmitted as well. This means that the master can re-order the data packets as they arrive.

An advantage of such a scheme is that it is potentially deadlock free, since the only blocking condition is when a target is full and cannot accept further transactions. This condition only affects those masters wishing to access that particular target and will clear as the target processes its transaction queue. Read data can always be retired since the requesting masters are defined as always being able to accept data they have requested.

A master that makes requests for read data from more than one target within the overall latency time of any of those targets may well receive data packets in the wrong order. Since the master must accept data packets regardless of the order in which it receives them, some method is required to re-order the data packets in the correct order for consumption by the function provided by the master.

Figure 28:
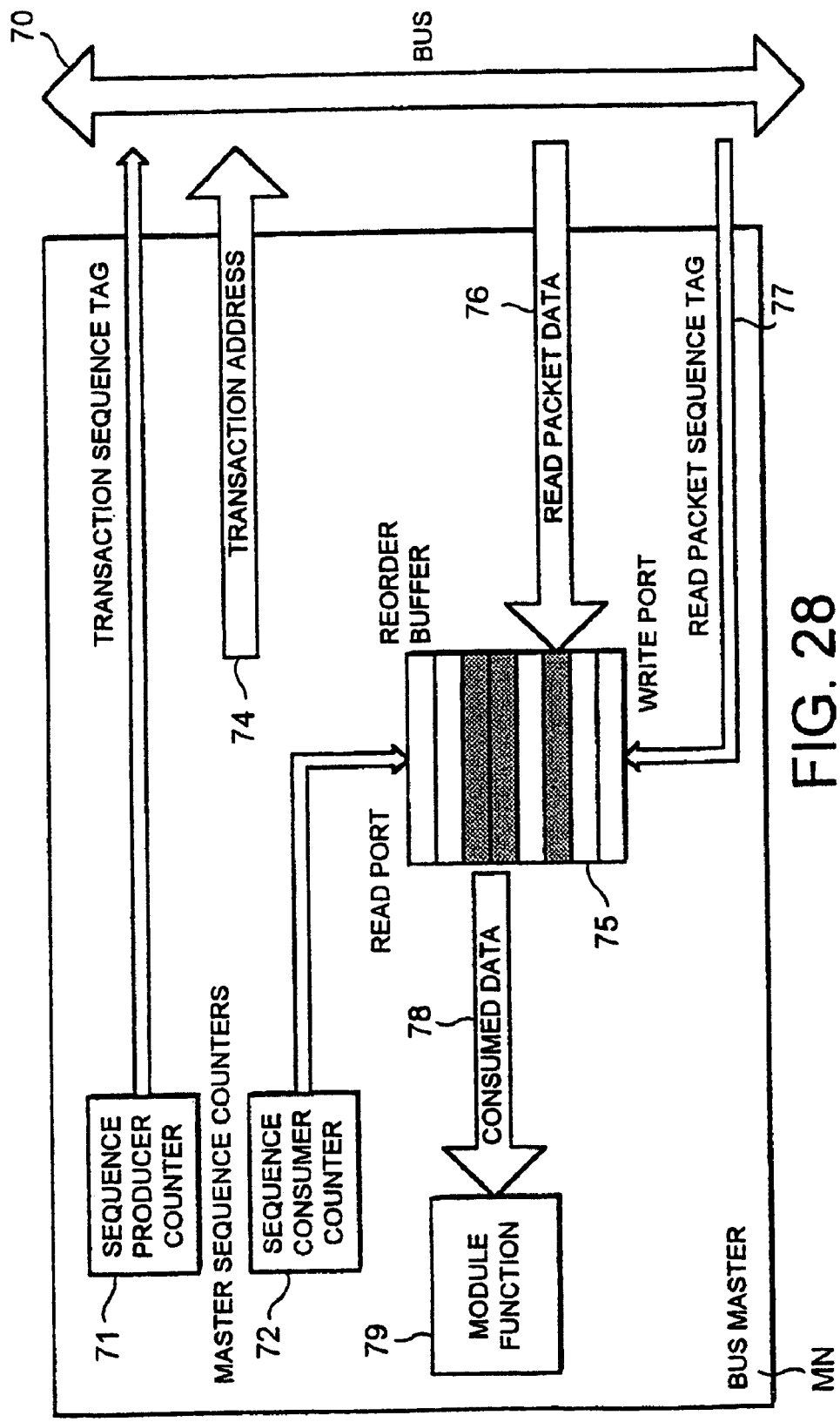
FIG. 28 illustrates a representative master module.

FIG. 28 shows representationally a master module MN, which is connected to a bus 70, and which provides a module function 79. The master module MN requests data using a transaction request inducing transaction address data supplied on the transaction bus by a transaction output request stage 74. The transaction request also includes a transaction sequence tag which is produced by a sequence producer counter 71. This sequence tag indicates the relative order in which the transaction has been produced. When read data is received, via an input 76, that read data packet has a read packet sequence tag associated with it which is received by an input 77. The read sequence tag, which is equivalent to the transaction sequence tag output by the master with its transaction request, is used to indicate where the read data packet should be stored within a two port memory, ie. RAM, buffer 75. The read data packet 76 is input via the memory write port and is written at a position within the memory indicated by the sequence tag 77.

The consumer counter 72 provides a signal for controlling the output from the RAM 75. The data packets are read from the RAM via its read port in strict rotation. The consumed data 78 is thereby provided to the module function 79.

The RAM re-order buffer is treated as a circular queue, which is addressed by the sequence tags. Packets arriving on the bus are written to a RAM slot indicated by the input sequence tag associated with the packet, whilst packets are read from the buffer in strict order. The consumption of data by the master will stall during a period of waiting for the next expected data packet. The arrival of data packets associated with later transactions are ignored. The number of transactions that can be awaited in this way is determined by the number of addresses in the dual port RAM.

Target Module Data Tag Queues

A similar function can be provided at a target module so that the data provided by the target module in response to a read request is output from the module in the order in which the transactions are received by the target module. This can be used in addition to the data packet re-ordering scheme mentioned above, or independently of such a method.

Figure 29:
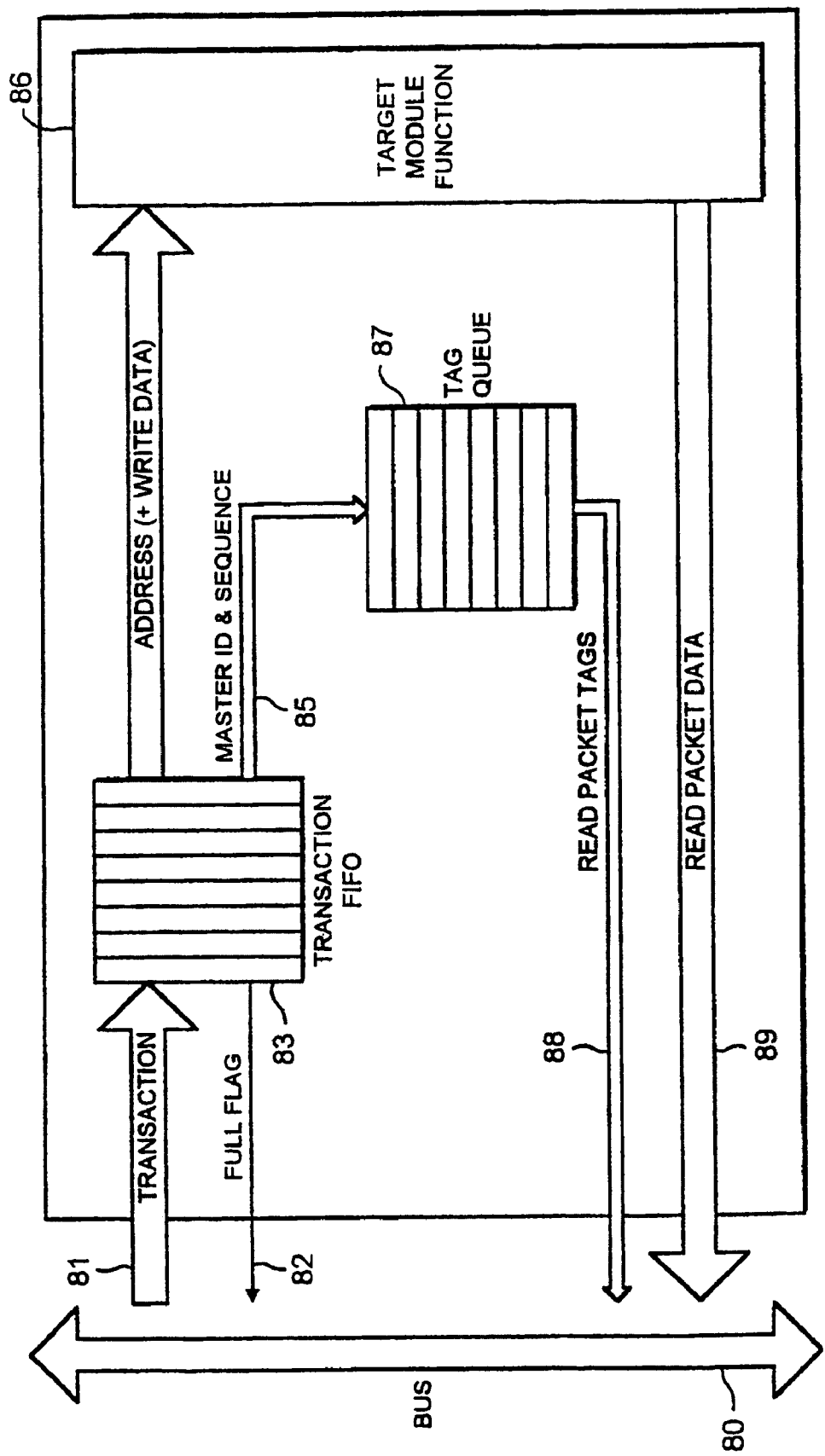
FIG. 29 illustrates representative target module.

As shown in FIG. 29, a representative target module having a target module function 86 is connected to a bus 80 for transferring data packets to and from requesting master modules (not shown). A transaction request is received by the transaction input line 81 and is stored in a transaction first in first out (FIFO) register 83. If the register 83 is full, then a full flag is returned via a control line 82 to the requesting module or arbitration unit (not shown).

The first in first out FIFO register 83 supplies address data to the target function 86, whilst identification and sequence data is passed to a further first in first out FIFO buffer 87. This buffer 87 provides a tag queue, and is used so that master module identification and sequence data can be recombined with data packets read by the target function 86. When a data packet to be output to the master is returned by the target function 86, then the associated tag (ID and sequence data) is output onto the bus at the same time, thereby identifying the output read data. The tags are output using control lines 88 and the read data packet output on the line 89.

If the transaction concerned is a write transaction, where write data is to be written to the target function 86, then the address and write data is passed to the target function 86 from the transaction FIFO 83, but the ID and sequence data is not transferred to the tag queue, since no return data is required in that case.

It will be readily appreciated that the use of first-in-first-out (FIFO) registers 83 and 87 provides a method of ordering incoming transactions and outgoing data.

Modular Topology

In all the bus architectures described above, the common aspect is that a number of modules M1, M2 and M3 etc. are connected to a single bus. It is therefore desirable to provide a scheme in which modules can be easily attached to the bus architecture, without a corresponding change in bus properties.

Figure 30:
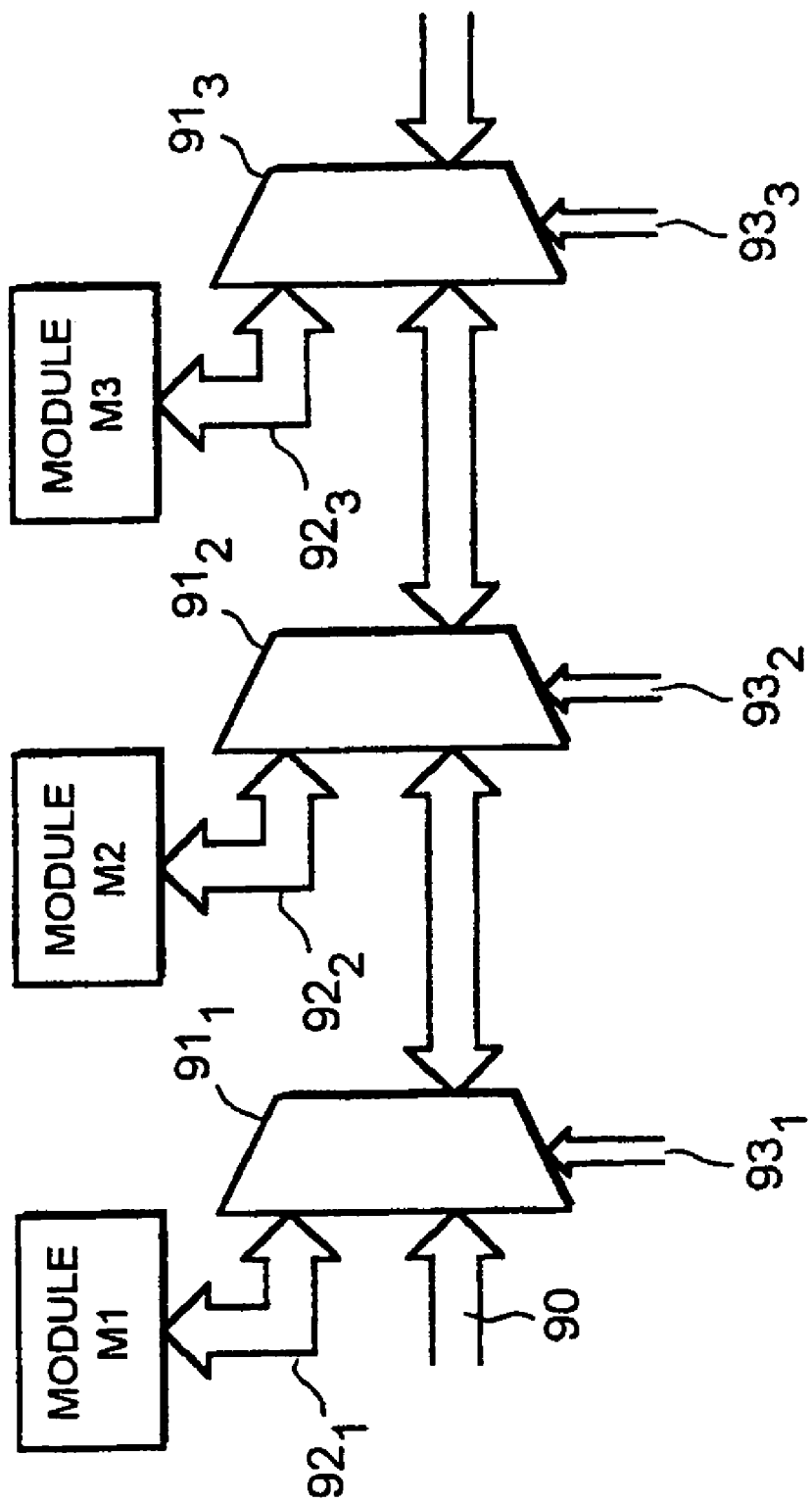
FIG. 30 illustrates a modular bus topology.

FIG. 30 illustrates a modular bus architecture topology. Three modules are shown in the example of FIG. 30, but any number of modules could be connected in this way. A bus 90 is punctuated by a number of bus connection modules $91_1$, $91_2$ and $91_3$ which are preferably, but not necessarily, equally spaced along the bus 90. Each of the connection modules $92_1$, $92_2$ or $92_3$ allows a module M1, M2 or M3 to be connected to the bus.

The bus connection modules $91_1$, $91_2$ and $91_3$ are typically controlled such that only one of the modules M1, M2 or M3 is connected to the bus at any one time. This is achieved by the connection modules 91 being controlled by respective inputs $93_1$, $93_2$ and $93_3$ from the bus architecture arbitration unit (not shown).

Each of the bus connection modules 91 includes buffering and output circuitry which can be tailored for the particular length of bus between it and the next connection module. Thus, the signal characteristics along the bus can be optimised since the load on each of the buffers from the interconnection modules is known. A particular advantage of this system is that if, for example, module M2 is not required in a particular application, then it can be simply omitted from the design, but the connection module $91_2$ enables the bus characteristics to be maintained along the length of the bus.

In the split bus examples described earlier, using split read/write and transaction buses, each of the buses can be treated in the same way illustrated in FIG. 30. More particularly, the schematic diagram shown in FIG. 30 is applicable to each of the read, write and transaction buses individually as well as appropriate combinations thereof. In a particular example, the write and transaction buses will be connected to modules in the manner shown in FIG. 30, but the read bus could be hard wired and permanently connected to each of the modules. This could be made possible by associating identity data with the incoming read data so that each of the modules is able to identify the data packets intended for its consumption without need for reference to the arbitration unit. This is a result of the split read/write buses being able to maintain separate read and write transactions on the bus architecture.

Secondary Bus Idle Usage

A further improvement may be made to the latency of the secondary bus by utilising the time when the bus is idle.

Figure 31:
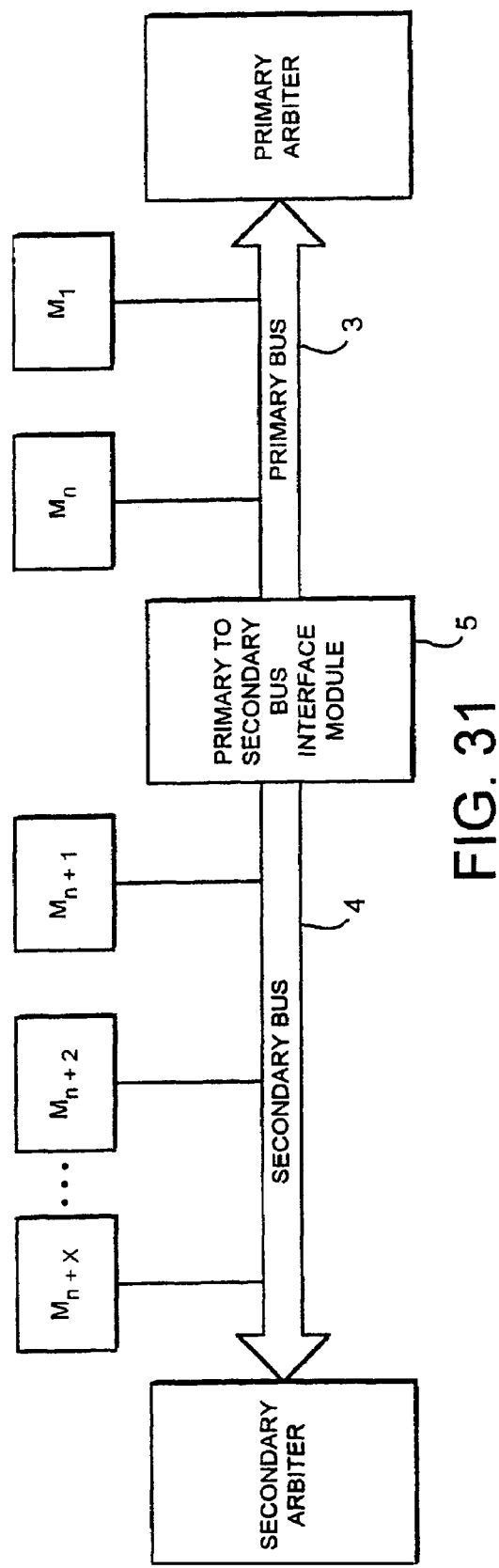
FIG. 31 illustrates an apparatus for use in a computer system, whereby the apparatus uses idle time slots to reduce latency.

Referring to FIG. 31, the secondary arbitration unit is normally located at the end of the secondary bus 4. When a master unit, (for example module $M_{n+x}$), wishes to make a transaction, a request is sent to the arbitration unit. The arbitration unit decides whether to grant the request according to the arbitration techniques described above. Since module $M_{n+x}$ is located near the arbitration unit, this request for making a transaction is serviced in a small number of clock cycles.

However, if module $M_{n+1}$ wishes to make a transaction, the request must also be sent to the arbitration unit, which may be many pipeline lengths away. As a consequence, a request from module $M_{n+1}$ takes longer to service than a request from module $M_{n+x}$.

To overcome this problem, whenever the bus is idle, the arbitration unit places "empty" packets on the bus at every available clock cycle. The empty packets travel along the bus, and may be used by any module that wishes to make a transaction. A module can then grab a free packet rather than requesting a dedicated packet and awaiting its return.

If module $M_{n+2}$ makes a request for a transaction, but in the meantime receives an empty packet from the arbitration unit, it is free to use the empty packet rather than await for its requested packet to return. However, when the requested packet eventually returns at a later time, module $M_{n+2}$ can then convert this packet which it no longer needs into an empty packet. This converted packet can then continue along the bus, and may be used by another module wishing to make a transaction.

Using the idle bus time in this manner enables the average transaction request time to be significantly reduced.

The apparatus described above may be used in many applications, for example, personal computers, laptops, microprocessors, microcomputers, graphics systems, Simultaneous Instruction Multiple Data (SIMD) applications, parallel processing, set-top boxes (satellite decoders and digital television decoders), or consumer appliances.

The invention claimed is:

1. An integrated circuit for a computer system comprising:
    a bus architecture;
    a plurality of modules connected to the bus architecture; and
    an arbitration unit for granting access to the bus in response to requests received from the modules, the granting of access being in the form of a dedicated packet issued from the arbitration unit, whereby only the module which has been granted access can use that particular dedicated packet to gain access to the bus;
    characterised in that the arbitration unit is operable to issue empty packets during periods when the bus is idle, the empty packets being usable by a module to gain access to the bus without making a specific request to the arbitration unit for a dedicated packet,
    wherein the bus is a pipelined packet switched bus that is open-ended.

2. The integrated circuit as claimed in claim 1, wherein the first module to use the empty packet gains access to the bus.

3. The integrated circuit as claimed in claim 1, wherein each module has means for converting a dedicated packet intended for itself into an empty packet.

4. The integrated circuit as claimed in claim 1, wherein the arbitration unit is located at one end of the bus.

5. A computer system comprising the integrated circuit as claimed in claim 1.

6. A graphics processing system comprising the integrated circuit as claimed in claim 1.

7. A games console comprising the integrated circuit as claimed in claim 1.

8. A method of granting bus access to a module in an integrated circuit for a computer system comprising a plurality of modules interconnected by the bus, and an arbitration unit for granting access to the bus by issuing dedicated packets in response to requests received from the modules, the method comprising:
    issuing empty packets from the arbitration unit during periods when the bus is idle; and,
    allowing any module to use the empty packet in order to gain access to the bus,
    wherein the bus is a pipelined packet switched bus that is open-ended.

* * * * *